United States Patent
Van der Lely

(10) Patent No.: US 6,915,197 B2
(45) Date of Patent: Jul. 5, 2005

(54) SYSTEM FOR AND A METHOD OF PERFORMING A FIRST AND A SECOND AGRICULTURAL OPERATION ON AN AGRICULTURAL PARCEL

(75) Inventor: Alexander Van der Lely, Rotterdam (NL)

(73) Assignee: Lely Enterprises Ag, Zug (CH)

( * ) Notice: Subject to any disclaimer, the term of this patent is extended or adjusted under 35 U.S.C. 154(b) by 75 days.

(21) Appl. No.: 10/250,128

(22) Filed: Jun. 5, 2003

(65) Prior Publication Data

US 2003/0229435 A1 Dec. 11, 2003

(30) Foreign Application Priority Data

Jun. 6, 2002 (NL) .............................................. 1020804

(51) Int. Cl.$^7$ .......................... A01B 69/00; G06F 19/00
(52) U.S. Cl. .............................. 701/50; 701/2; 701/213; 460/6; 342/357.17
(58) Field of Search ............................. 701/50, 2, 213, 701/208, 210, 211, 214, 209; 460/1, 4, 5, 6, 116, 119, 150, 114; 342/357.17, 357.07; 340/992, 995.17; 345/441; 700/28, 31, 48, 28.31

(56) References Cited

U.S. PATENT DOCUMENTS

| | | | |
|---|---|---|---|
| 4,769,700 A | | 9/1988 | Pryor |
| 5,528,888 A | | 6/1996 | Miyamoto et al. |
| 5,606,850 A | | 3/1997 | Nakamura |
| 5,931,882 A | * | 8/1999 | Fick et al. ..................... 701/50 |
| 5,957,304 A | * | 9/1999 | Dawson ...................... 209/552 |
| 5,995,895 A | | 11/1999 | Watt et al. |
| 6,128,574 A | | 10/2000 | Diekhans |
| 6,199,000 B1 | * | 3/2001 | Keller et al. ................... 701/50 |
| 6,246,932 B1 | * | 6/2001 | Kageyama et al. ........... 701/24 |
| 6,651,005 B2 | * | 11/2003 | O'Neall .......................... 702/5 |
| 6,668,157 B1 | * | 12/2003 | Takeda et al. .............. 455/11.1 |
| 6,678,097 B2 | * | 1/2004 | McKenney .................. 359/742 |
| 6,698,368 B2 | * | 3/2004 | Cresswell .................... 111/200 |

FOREIGN PATENT DOCUMENTS

WO WO 9846065 A 10/1998

* cited by examiner

*Primary Examiner*—Tan Q. Nguyen
(74) *Attorney, Agent, or Firm*—Howrey LLP; Jacobus C. Rasser; David P. Owen

(57) ABSTRACT

A system for performing a first and a second agricultural operation on an agricultural parcel. The system is provided with a first autonomous agricultural machine for performing the first agricultural operation, with a second autonomous agricultural machine for performing the second agricultural operation, a control-unit for controlling the agricultural operations to be performed, the control-unit being suitable for subdividing the agricultural parcel into at least a first and a second parcel portion, and for first performing the first and the second agricultural operations on the first parcel portion, and subsequently on the second parcel portion.

12 Claims, 4 Drawing Sheets

SYSTEM FOR AND A METHOD OF PERFORMING A FIRST AND A SECOND AGRICULTURAL OPERATION ON AN AGRICULTURAL PARCEL

CROSS REFERENCE TO RELATED APPLICATIONS

This application claims priority from Dutch patent application no. 1020804 filed 6 Jun. 2002, the contents of which are hereby incorporated by reference in their entirety.

BACKGROUND OF INVENTION

1. Field of Invention

The invention relates to the field of agriculture and in particular to a system for performing a first and a second agricultural operation on an agricultural parcel.

2. Description of the Related Art

Systems are known for performing agricultural operations in which a number of operator controlled vehicles perform first and second agricultural operations in an agricultural parcel.

SUMMARY OF INVENTION

According to the present invention there is provided an alternative system for performing a first and a second agricultural operation on an agricultural parcel.

For this purpose, a system according to the invention for performing a first and a second agricultural operation on an agricultural parcel, comprises a first autonomous agricultural machine for performing the first agricultural operation; a second autonomous agricultural machine for performing the second agricultural operation; and a control-unit for subdividing the agricultural parcel into at least a first and a second parcel portion and for controlling the first and the second agricultural operations to be first performed, on the first parcel portion, and subsequently on the second parcel portion.

In an embodiment of a system according to the invention, the system may be provided with parameter-measuring means for measuring a momentary value of a variable parameter and for emitting a parameter-value-signal to the control-unit, the control-unit performing the subdivision of the agricultural parcel into parcel portions on the basis of data from the parameter-measuring means.

The parameter measuring means preferably comprise atmospheric-condition-obtaining means for obtaining data about the atmospheric conditions and for emitting an atmospheric-condition-signal to the control-unit. As there are numerous systems that provide weather information, such as weather satellites, internet and the like, the atmospheric-condition-obtaining means can for example retrieve this weather information via a telephone connection or the like and control the control device in dependence thereon. Alternatively or additionally, the atmospheric-condition-obtaining means comprise measuring means for measuring the atmospheric conditions. Alternatively or additionally, the parameter-measuring means comprise soil-condition-measuring means for obtaining data about the soil condition and for emitting a soil-condition-signal to the control-unit. Alternatively or additionally, the parameter-measuring means comprise crop-condition-measuring means for obtaining data about the crop condition and for emitting a crop-condition-signal to the control-unit. Thus it is possible for example to transmit a condition-signal to the control-unit on the basis of the degree of humidity of the crop to be mown, the magnitude of the condition-signal causing the control-unit to determine the size of the agricultural parcels.

In an advantageous embodiment of a system according to the invention, the control-unit comprises a memory for containing historical data, in particular the progressive average of a variable parameter, the control-unit performing the subdivision of the agricultural parcel into parcel portions with the aid of historical data from the memory.

The invention further relates to a method of performing a first and a second agricultural operation on an agricultural parcel, comprising: subdividing the agricultural parcel into at least a first and a second parcel portion; performing the first agricultural operation by a first autonomous agricultural machine on the first parcel portion; performing the second agricultural operation by a second autonomous agricultural machine on the first parcel portion; and subsequently performing the first and the second agricultural operations on the second parcel portion. In this manner the two autonomous agricultural machines are first active on the first parcel portion for performing the relevant agricultural operations, after which the two autonomous agricultural machines are active on the second parcel portion. This agricultural operation per parcel portion offers significant advantages in some cases.

In particular, in an embodiment of a method according to the invention, the method may comprises measuring a momentary value of a variable parameter and of selecting the size of a parcel portion on the basis of the measured value. In this manner it can be ensured that the first and the second agricultural operations can be performed on a parcel portion under circumstances that are the most favourable for the relevant agricultural operations.

In a further embodiment of a method according to the invention, the method comprises the step of selecting the size of a parcel portion on the basis of historical data, in particular the progressive average of a variable parameter.

BRIEF DESCRIPTION OF DRAWINGS

An embodiment of the invention will now be explained in further detail by way of example only with reference to the accompanying figures, in which.

DETAILED DESCRIPTION

Figure 1:
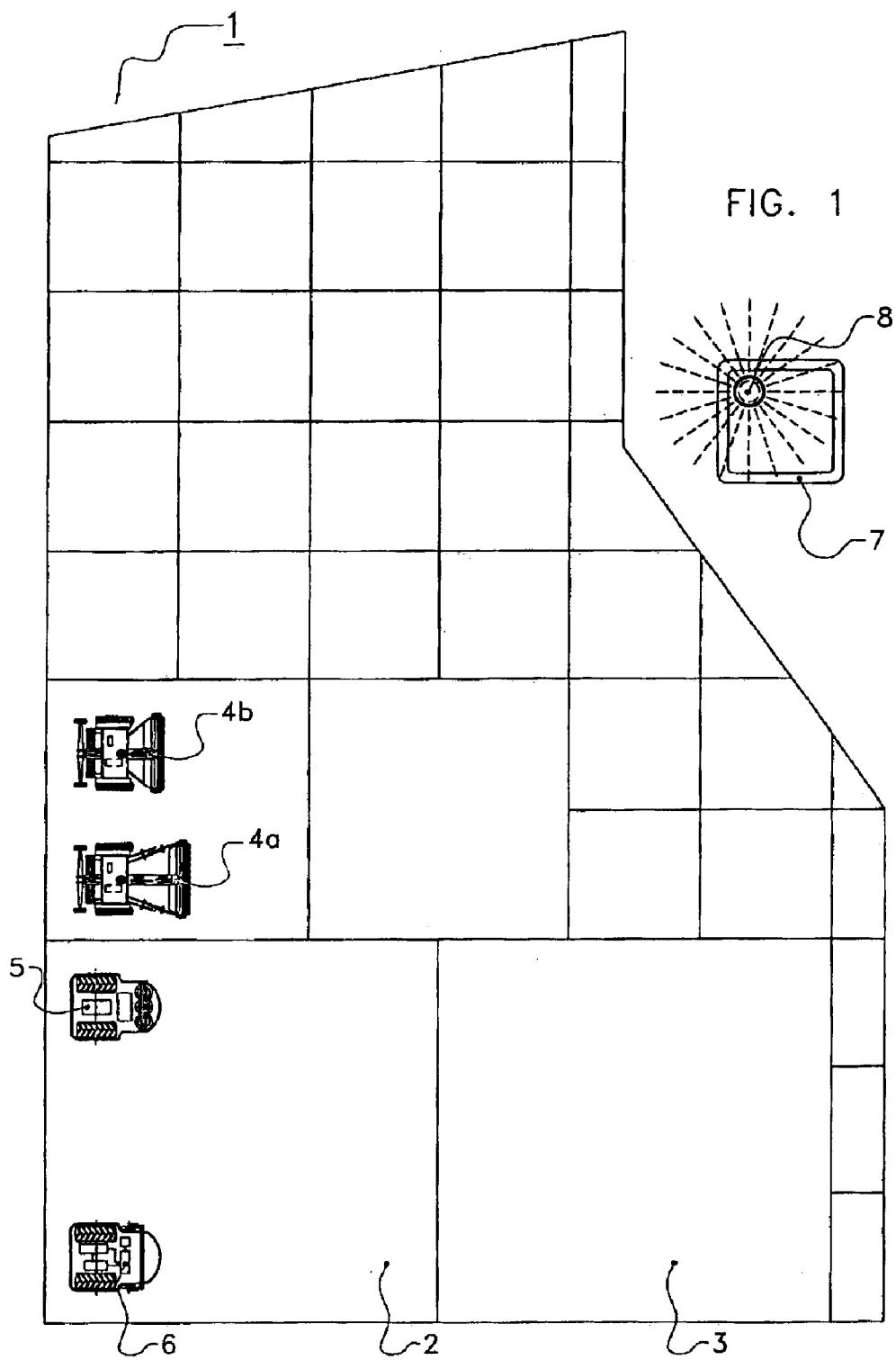
FIG. 1 shows schematically in plan view a number of autonomous agricultural machines belonging to a system according to an embodiment of the invention in an agricultural parcel.

FIG. 1 shows schematically in plan view a number of autonomous agricultural machines 4a, 4b, 5, 6 in an agricultural parcel 1 in an embodiment of the invention. It is pointed out here that an autonomous machine, i.e. a machine that does not require a driver for being moved, is known per se and will therefore not be set out here in further detail for the sake of simplicity of the description. Such an autonomous machine may for instance be of the type described in U.S. Pat. No. 4,769,700 the contents of which are hereby incorporated by reference in their entirety. Various aspects of an autonomous machine are also disclosed in co-pending U.S. patent applications Ser. No. 10/250,099 entitled "An Agricultural Machine for Performing an Agricultural Operation"; Ser. No. 10/250,101 entitled "An Agricultural Machine for Performing Crop Processing"; Ser. No. 10/250,121 entitled "An Autonomous Agricultural Machine for Performing an Agricultural Operation, in Particular Crop Processing"; Ser. No. 10/250,105 entitled "A Device for Crop Processing"; Ser. No. 10/250,126 entitled "An Assembly for Performing Crop Harvesting"; Ser. No. 10/250,131 entitled "An Assembly for Performing an Agricultural Operation, in Particular Crop Processing"; Ser. No. 10/250,104 entitled "An Agricultural Machine for Performing an Agricultural Operation, in Particular Crop Processing"; and Ser. No. 10/250,127 entitled "An Assembly and an Autonomous Agricultural Machine for Performing an Agricultural Operation, in Particular Crop Processing", all of which claim priority in the Netherlands on 6 Jun. 2002. The contents of these applications are hereby incorporated by reference in their entirety.

Figure 2A:
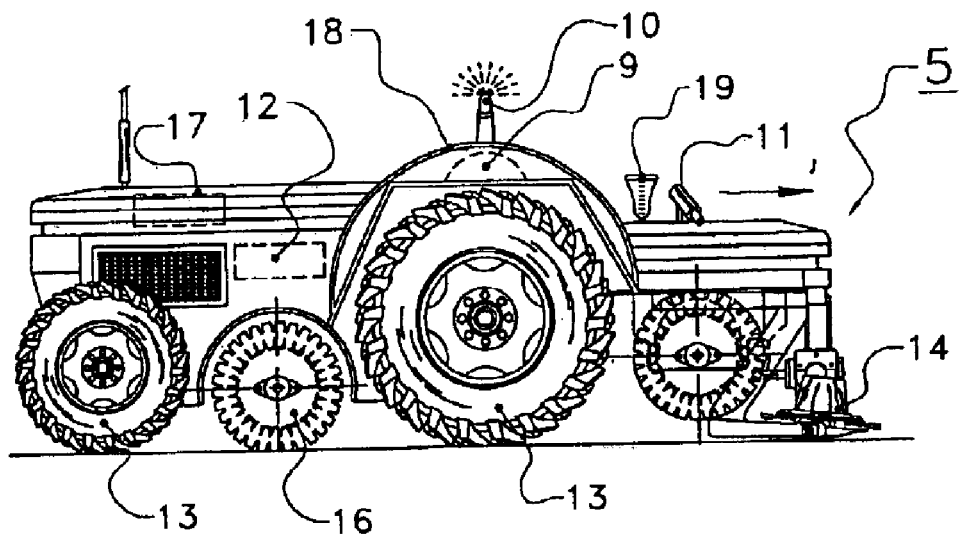
FIG. 2A shows schematically a first autonomous machine for performing a number of crop-processing operations.
Figure 2B:
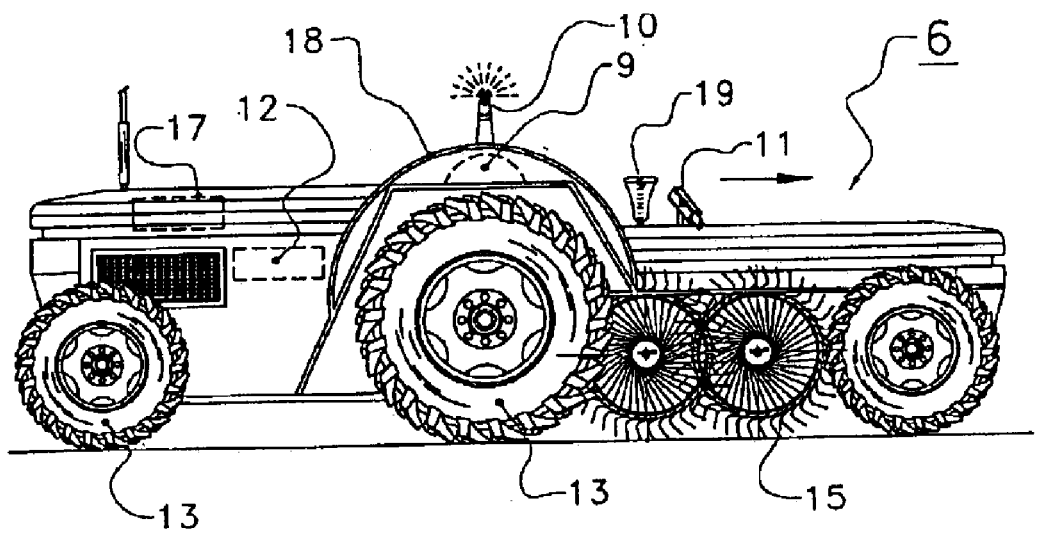
FIG. 2B shows schematically a second autonomous machine for performing a further crop-processing operation.

The autonomous agricultural machine 5 (as shown in further detail in FIG. 2A) is suitable for performing at least one crop-processing operation on a crop that is present on a first parcel portion 2. In the embodiment shown the autonomous machine 5 is a machine for mowing and crushing the crop that is present on the first parcel portion 2. The autonomous agricultural machine 6 (as shown in further detail in FIG. 2B) is suitable for automatically raking the crop that has been mown and crushed by the autonomous agricultural machine 5. The machines 5, 6 are autonomously displaceable by determining the position of the autonomous machines 5, 6 in the field with the aid of a control-unit 7, provided with a transmitter 8 and a position-determining system 9, possibly provided with an aerial 10. Such position-determining systems are known per se: for example GPS, DGPS, Galileo, or position determination by means of beacons and the like. The autonomous machines 5, 6 further comprise a boundary-detecting system 11, for example one or more cameras or another boundary-detecting system known per se, for detecting a boundary of already mown crop, for example already mown crop that has been tedded or deposited in a swath. In the case that the crop processing does not automatically produce a boundary, the device can be controlled in such a manner that a detectable boundary is produced. With the aid of data from the position-determining system 9, 10 and/or the boundary-detecting system 11 a control device 12 for controlling the autonomous machines 5, 6, in particular the drive motor and the wheels 13 thereof, is controlled in such a way that the autonomous machines 5, 6 follow a route in the field to be processed, which route, according to the invention, ensures that first the entire surface of the first parcel portion 2 is processed by the two autonomous machines 5, 6, after which the two autonomous machines 5, 6 move to the second parcel portion 3.

The autonomous machine 5 is provided with a mowing-unit 14 for mowing the crop. Such a mowing-unit 14 may be constituted by the nowadays frequently used disc-mowers or (double)-knife-mowers. Although a drum-mower can be applied as well, it is not preferred because of its larger weight relative to other mowing-units. However, a cage-mower known per se is extremely suitable. By means of a cage-mower it is not only possible, for example, to convey the mown crop in a simple manner to a receptacle or a drag bag, but said cage-mower is preferable to the other known mowing-units because of its safety. There is disposed a crushing-unit 16 for crushing mown crop. Also here it is possible to use crushing-units known per se.

The autonomous machine 6 comprises a rake-unit 15 for raking mown crop.

Such a rake-unit is also known per se and may be constituted for example by swath boards and/or rotating rakes.

According to the invention, the autonomous machines 5, 6, for example pre-programmed by a user by means of a keyboard 17, perform at least two crop-processing operations (for example mowing and raking) over the entire surface of the first parcel portion 2, after which the autonomous machines move to the second parcel portion 3 for performing there the at least two crop-processing operations.

In order to ensure the safety of human beings and animals present in the vicinity of the autonomous machines 5, 6, said autonomous machines 5, 6 are provided with a number of protecting and safety means. Such safety means may be as described in the above mentioned co pending applications.

The autonomous machines 5, 6 are provided with a schematically shown cap 18 covering the crop-processing components, so that in particular the rotating parts are protected There are further provided detectors, for example constituted by the camera 11, for detecting living beings present in the vicinity of the autonomous machines 5, 6. Said sensors are known per se, and as examples thereof are mentioned picture recognition systems, colour meters, infra-red meters, ultrasonic detectors, lasers, mechanical feelers, and conductivity meters. For the sake of security, in particular the rear side of the autonomous machines 5, 6 is monitored by a plurality of sensors and protected by a plurality of mechanical protecting means, such as protective caps, flaps and the like. The autonomous machines 5, 6 may have for example a length of 400 cm, a width of 200 cm, and a maximum weight of 3000 kg, which makes the autonomous machines 5, 6 easily transportable. Further a motor with a small capacity of for example 40 kW can be used, so that only a small quantity of fuel needs to be on board for a working duration of for example 12 or 24 hours.

The autonomous machines 5, 6 are further provided with atmospheric-condition-obtaining means, in the embodiment shown constituted by an aerial 10, that is in connection with a weather satellite, (not-shown) and the control device 12 (that is provided with a computer), for obtaining current weather information. Of course, other atmospheric-condition-obtaining means, which are also capable of obtaining a weather forecast issued by any institution that is active in this field, can be applied as well. Besides or additionally, the parameter-measuring means 19 may be provided with measuring means for measuring the atmospheric conditions (for example a pluviometer or a thermometer) and/or with soil-condition-measuring means for obtaining data about the soil condition (for example whether the soil is dry or wet) and/or with crop-condition-measuring means for obtaining data about the crop condition (for example humidity of grass). Of course, other parameter-measuring means known per se for measuring a changing parameter can also be used, which parameter influences the determination of the size of the parcel portions. In this case the control device 12 adapts for example the size of the parcel portions to the expected weather conditions. When for example a considerable quantity of rain is expected in less than an hour, then the control device will adapt the size of the parcel portion in such a way that all the crop-processing operations to be performed on the parcel portion will be carried out before the expected rain has begun to fall.

It is thus possible for the control device 12 to control, on the basis of the signal emitted by the parameter-measuring means 19, the agricultural machines 5, 6 in such a way that a desired functioning is obtained. For example when a heavy shower is expected, the control device can control the agricultural machine in such a way that mowing takes place faster, although this entails a higher energy consumption. Besides; in the case that a particular quantity of fallen rain has been measured or the crop has a particular degree of humidity, the control device can interrupt the mowing operation. It sometimes happens that, after an extensive shower, the soil is very wet, as a result of which the load bearing capacity of the soil could be insufficient for the agricultural machine. In this case the control device can stop the drive of the wheels of the agricultural machine.

Before a crop-processing operation can be performed, in an earlier stage a soil preparation, a sowing operation and possibly a manure application have to be performed. As described above, the size of the parcel portions can also be adapted for these agricultural operations to momentary or expected weather conditions. Previously the sizes of the parcel portions can be chosen in such a way that the agricultural operations on a parcel portion can be performed within one and the same period (for example within one hour). As some parts of the agricultural parcel are more difficult to prepare than others (based on historical data), the size of the parcel portions can be different. These historical data can constantly be updated automatically, so that for example a progressive average is obtained. Hereinafter will be described briefly an autonomous machine for performing a soil preparation including a sowing operation, and a machine for performing a manure application.

Figure 3A:
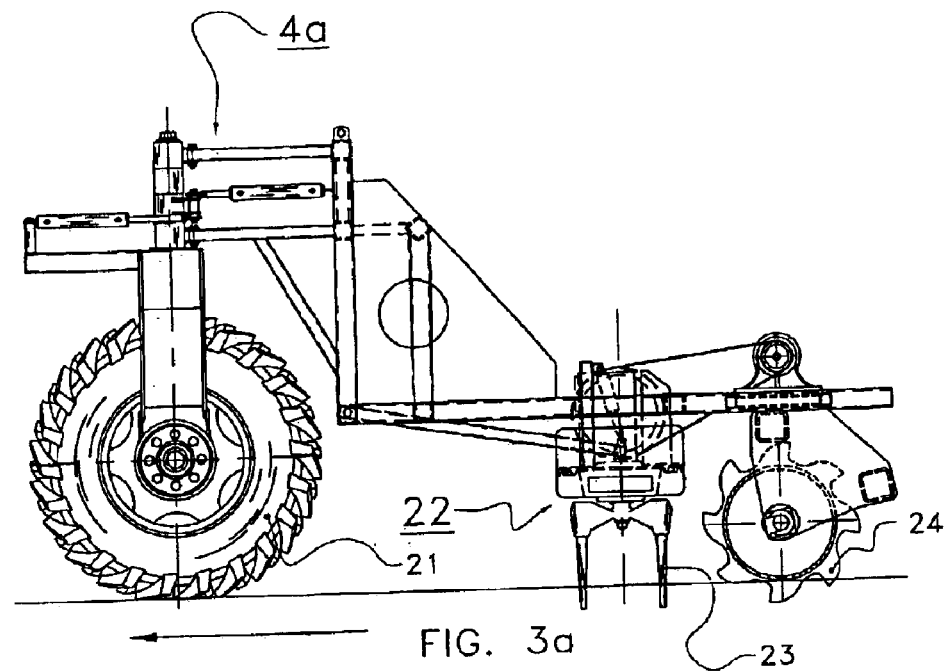
FIG. 3A shows schematically an autonomous machine for performing a harrowing-preparation.

FIG. 3A shows schematically in side view an autonomous soil-preparing device 4a for performing a soil preparation. It is pointed out here that an autonomous machine, i.e. a machine that does not require a driver for being moved, is known per se and will not be set out here in further detail for the sake of simplicity of the description.

In the embodiment shown the autonomous soil-preparing device 4a comprises only one wheel 21 that ensures the drive and the steering. The autonomous soil-preparing device 4a comprises a harrow-unit 22 that comprises a rotary harrow 23 and a packer roller 24 that is subdivided into a number of packer-roller-units that are located side by side and are rotatable separately from each other.

Analogous to the autonomous crop-processing machines 5, 6, the autonomous soil-preparing device 4a comprises a position-determining system (not-shown) for determining the position of the autonomous soil-preparing device 4a, such as a GPS-system known per se. The autonomous soil-preparing device may additionally be provided with a boundary-detecting system (for example one or more cameras) for detecting a boundary of already prepared soil. A control device (not-shown) controls the autonomous soil-preparing device 20 with the aid of data from the position-determining system and/or the boundary-detecting system, and other relevant data that can either be inputted previously or be measured momentarily by several measuring-units. Such properties may be device parameters and/or environment parameters. Quantity of fuel, oil temperature, number of revolutions of the rotary harrow, tyre pressure, ambient temperature, quantity of rain, etc. may for example be measured.

For inputting data, for example the setting of the desired working depth, there is provided (analogous to the autonomous crop-processing machines 5, 6) an input device (for example a keyboard).

A route-information system that is used for moving the autonomous soil-preparing device 4a may be provided with a memory for containing position data with respect to the agricultural parcel to be prepared.

The cameras (not-shown) can also be used e.g. in combination with picture recognition software, as protecting elements for protecting the autonomous soil-preparing device, so that collisions with moving obstacles are prevented.

Figure 3B:
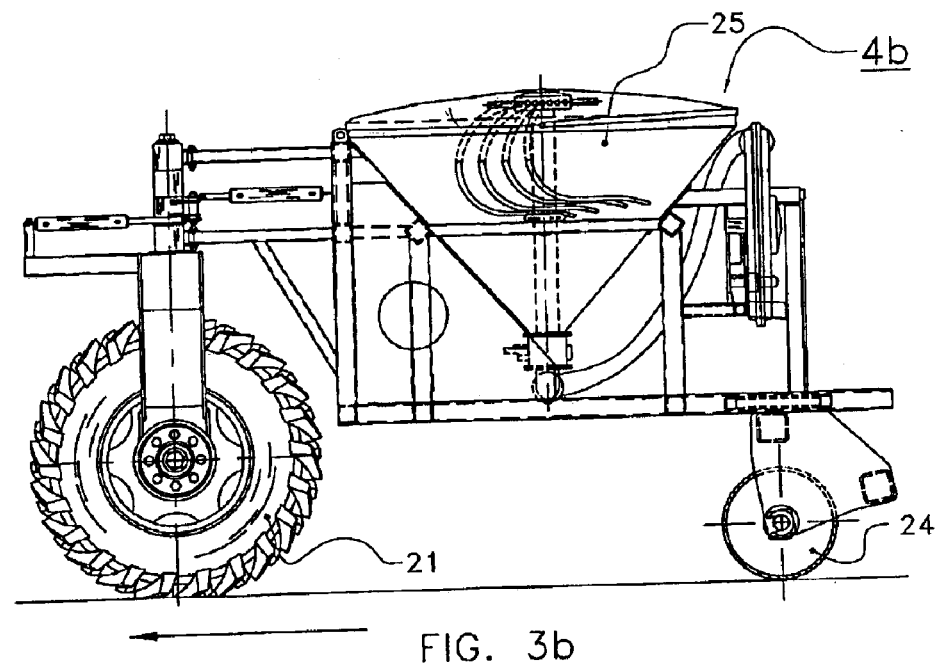
FIG. 3B shows schematically an autonomous machine for performing a sowing-preparation.

FIG. 3B shows schematically an autonomous sowing machine 4b with a sowing-unit 25 for sowing seed material. It is pointed out here that the sowing units known per se can be used. It is pointed out that the autonomous sowing machine, analogous to the autonomous soil-preparing device, comprises systems for autonomously controlling the machine. In the route-information system the positions of storage containers can then be stored in the memory. The data can be stored for example in the form of a ground plan.

It is thus possible that, after the autonomous soil-preparing device has prepared a parcel portion, said parcel portion is sown by the autonomous sowing machine, after which the autonomous machines move to the next parcel portion.

Analogous to the autonomous crop-processing devices 5, 6, the autonomous soil-preparing device 4a and the autonomous sowing machine 4b comprise measuring means for measuring preparation-relevant parameters, while, in this connection, preparation-relevant parameters in the broadest sense of the word are meant. The invention can then be applied to measuring means for measuring inter alia: weather situation (rain, wind, temperature), stock data, device parameters (such as fuel stock, battery level, working settings, such as working depth, sort of seed, etc.), soil conditions, moving obstacles.

Depending on the measured values, the control device can control the preparation (stop the preparation, if desired) or give an alarm to the-owner of the device. Malfunctions can then be registered in a particular memory. These values are preferably determined in real-time. The measured values can be kept permanently, but from a point of view of reduction of memory capacity the oldest data are preferably replaced by new data. It is pointed out that the size of the parcel portions for soil preparation can differ from the size of the parcel portions for crop processing.

Figure 4:
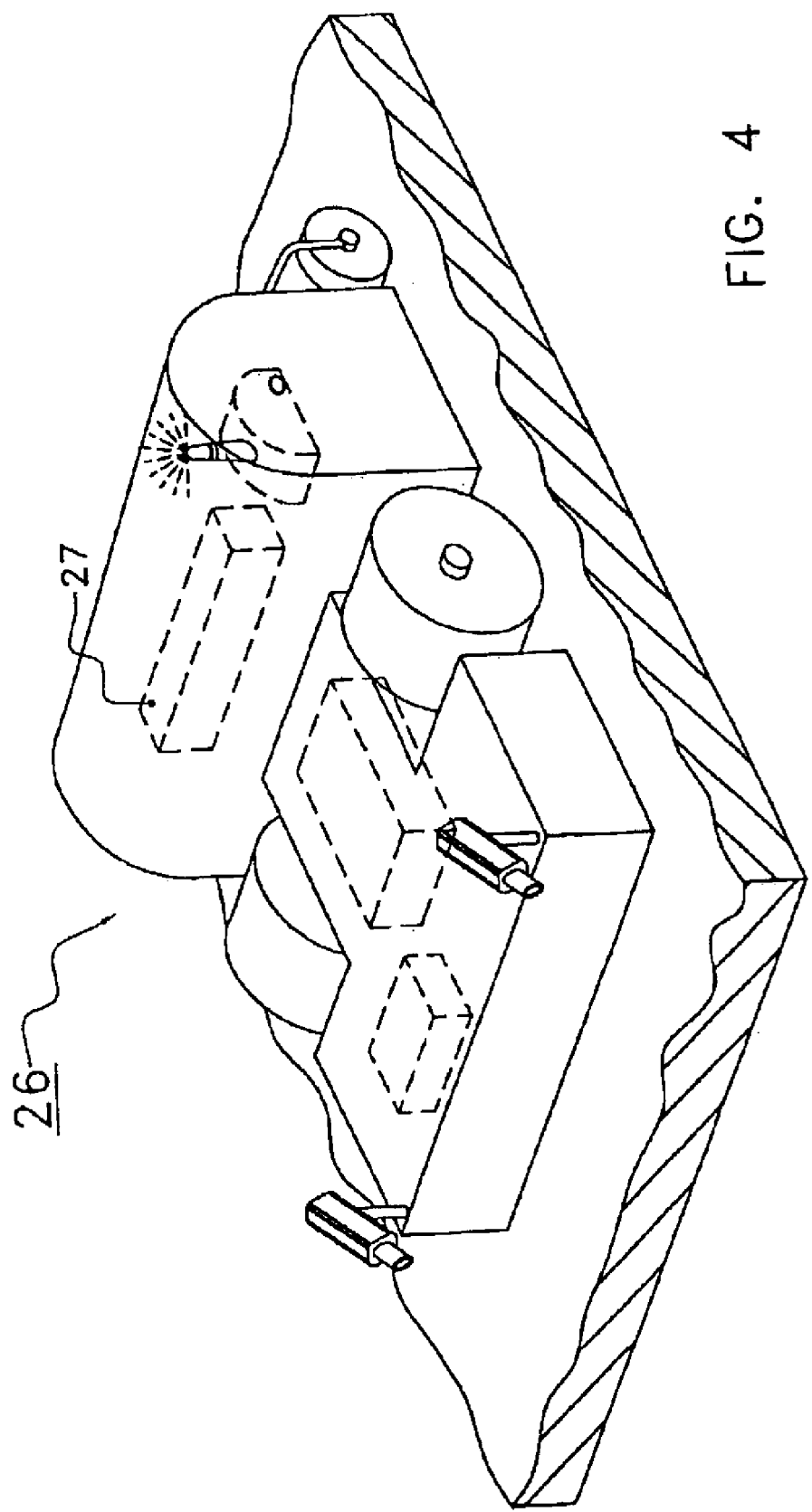
FIG. 4 shows schematically an autonomous machine for performing a manure application.

FIG. 4 shows schematically a perspective view of an autonomous manure-applying machine 26 for applying manure on the parcel portions of the agricultural parcel. A parcel portion is manured for example with the aid of a manuring-unit known per se, for example a fertilizer-spreader, or a liquid-manure-spraying device comprising drag hoses.

The manure-applying machine 26 comprises a machine container 27 for containing a working stock of fertilizer or manure. The autonomous agricultural machine 26 further comprises a route-information system known per se (not-shown) provided with a memory for containing position data with respect to the agricultural parcel. In particular the position of a storage container that contains a relatively large quantity of manure material is stored in the memory. The storage container may comprise a main storage tank and sub-storage tanks connected thereto via lines. For transporting manure material from the main storage tank to the sub-storage tanks, there may be used for example screw conveyors or pumps in the lines. The data may be stored for example in the form of a ground plan. The route-information system further comprises a position-determining element known per se (not-shown) for determining the position of the autonomous manure-applying machine 26 in the agricultural parcel by means of for example a GPS-system. With the aid of data from the route-information system, it is thus possible for the control-unit of the autonomous manure-applying machine 26, whilst taking the still present quantity of working stock as measured for example by a weighing device or another measuring device, to move the manure-applying machine 26 to the storage container, in particular to the storage tank that is located closest to the manure-applying machine. The manure-applying machine 26 can be combined with the autonomous soil-preparing device and the autonomous sowing machine for preparing the soil per parcel portion. It will be obvious that, for a correct co-operation of the autonomous agricultural machines, the control-units thereof are interconnected directly or indirectly, via a central control-unit, for exchanging relevant data.

Many modifications in addition to those described above may be made to the structures and techniques described herein without departing from the spirit and scope of the invention. In particular, the devices and methods disclosed herein may also be used in conjunction with further features of the above-referenced co-pending applications. Accordingly, although specific embodiments have been described, these are examples only and are not limiting upon the scope of the invention.

What is claimed is:

1. A system for performing a first and a second agricultural operation on an agricultural parcel, comprising:
   a first autonomous agricultural machine for performing the first agricultural operation;
   a second autonomous agricultural machine for performing the second agricultural operation;
   a control-unit for subdividing the agricultural parcel into at least a first and a second parcel portion and controlling the first and the second agricultural operations to be performed first, on the first parcel portion, and subsequently on the second parcel portion.

2. The system as claimed in claim 1, further comprising a parameter-measuring device for measuring a momentary value of a variable parameter and for emitting a parameter-value-signal to the control-unit.

3. The system as claimed in claim 2, wherein the control-unit subdivides the agricultural parcel into parcel portions on the basis of the parameter-value-signal.

4. The system as claimed in claim 3, wherein the parameter-measuring device comprises an atmospheric-condition-obtaining device for obtaining data about the atmospheric conditions and for emitting an atmospheric-condition-signal to the control-unit.

5. The system as claimed in claim 4, wherein the atmospheric-condition-obtaining device comprises an atmospheric-condition measuring device for measuring the atmospheric conditions.

6. The system as claimed in claim 3, wherein the parameter-measuring device comprises a soil-condition-measuring device for obtaining data about soil condition and for emitting a soil-condition-signal to the control-unit.

7. A system as claimed in claim 3, wherein the parameter-measuring device comprises a crop-condition-measuring device for obtaining data about a crop condition and for emitting a crop-condition-signal to the control-unit.

8. The system as claimed in claim 7, wherein the control-unit comprises a memory for containing historical data, in particular a progressive average of a variable parameter, the control-unit performing the subdivision of the agricultural parcel into parcel portions with the aid of the historical data from the memory.

9. A method of performing a first and a second agricultural operation on an agricultural parcel, comprising:
   subdividing the agricultural parcel into at least a first and a second parcel portion;
   performing the first agricultural operation by a first autonomous agricultural machine on the first parcel portion;
   performing the second agricultural operation by a second autonomous agricultural machine on the first parcel portion; and
   subsequently performing the first and the second agricultural operations on the second parcel portion.

10. The method as claimed in claim 9, wherein the method further comprises measuring a momentary value of a variable parameter and selecting a size of a parcel portion on the basis of the measured value.

11. The method as claimed in claim 10, wherein the method further comprises selecting the size of a parcel portion on the basis of historical data.

12. The method as claimed in claim 11, wherein the historical data is a progressive average of the variable parameter.

* * * * *